Aug. 5, 1958 D. O. BRANT 2,846,076
STRAINER
Filed Nov. 30, 1954 2 Sheets-Sheet 1
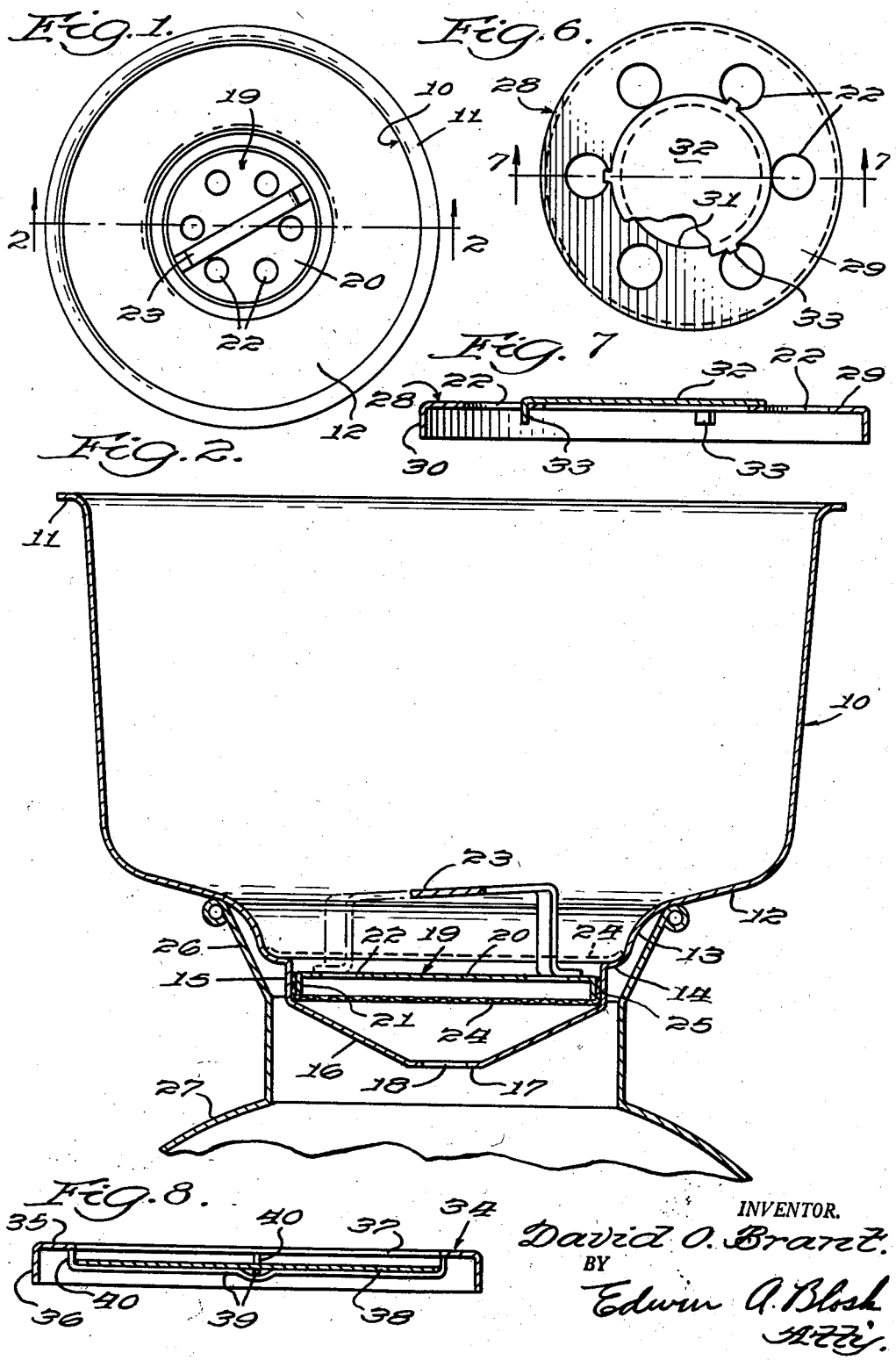
INVENTOR.
David O. Brant
BY
Edwin A. Blosh
Atty.

Aug. 5, 1958　　　D. O. BRANT　　　2,846,076
STRAINER
Filed Nov. 30, 1954　　　2 Sheets-Sheet 2
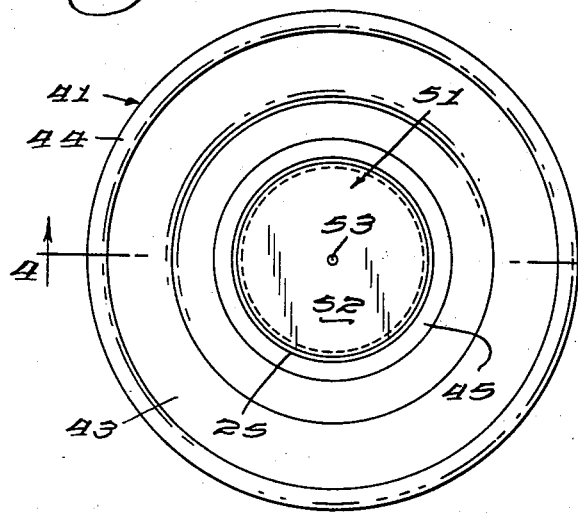
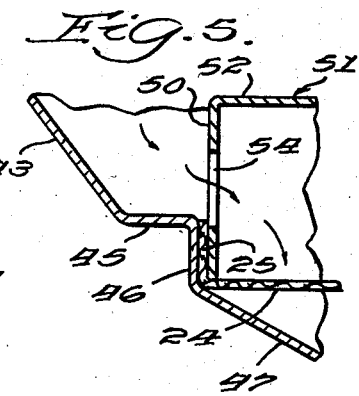
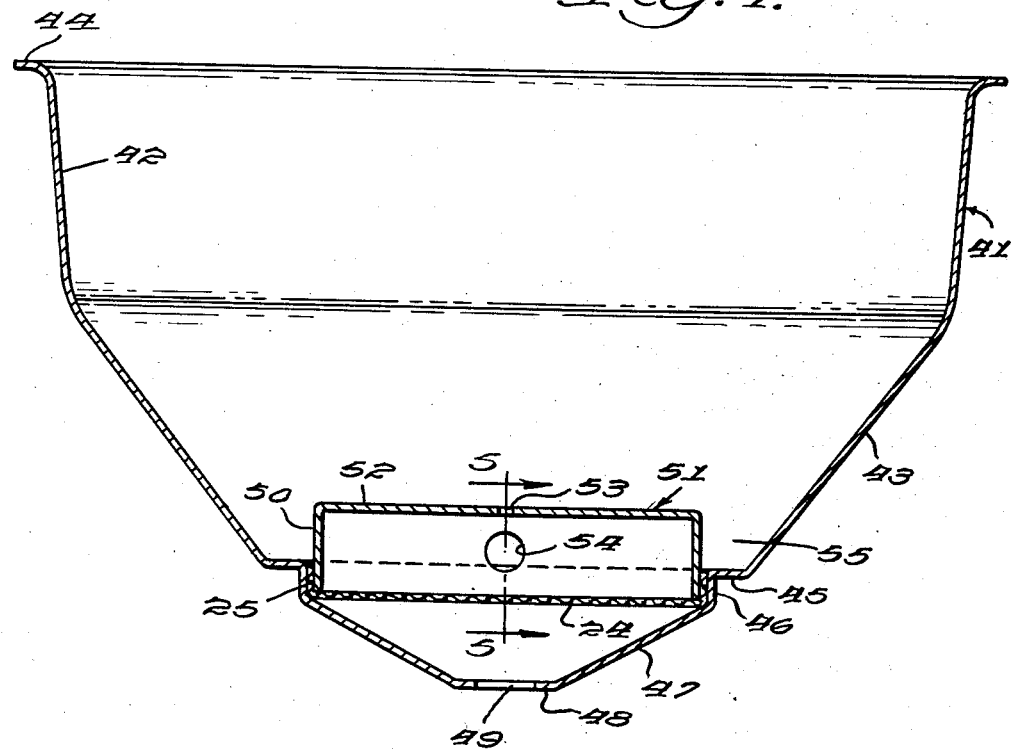
INVENTOR.
David O. Brant
BY
Edwin A. Block
Atty.

United States Patent Office 2,846,076
Patented Aug. 5, 1958

2,846,076

STRAINER

David O. Brant, Beverly Hills, Calif.

Application November 30, 1954, Serial No. 471,970

2 Claims. (Cl. 210—464)

This present invention relates to strainers for milk, cooking fats and the like.

A primary object of the invention is to provide a filter of the above-mentioned character which is simple and sturdy in construction, easy to inspect and clean, and economical to manufacture.

A further object of the invention is to provide a filter or strainer for milk and the like, which is highly effective and which provides for the rapid straining of large quantities of milk.

Another object is to provide a strainer or filter which is easy to assemble and disassemble, and including novel means for holding the strainer cloth in place.

Other objects and advantages of the invention will be apparent during the course of the following description.

In the accompanying drawings, forming a part of this application, and in which like numerals are employed to designate like parts throughout the same, Figure 1 is a plan view of a strainer in accordance with a preferred embodiment of the invention, Figure 2 is an enlarged central vertical section taken on line 2—2 of Figure 1, Figure 3 is a plan view of a filter in accordance with a modification of the invention, Figure 4 is an enlarged central vertical section taken on line 4—4 of Figure 3, Figure 5 is a further enlarged fragmentary vertical section taken on line 5—5 of Figure 4, Figure 6 is a plan view of a modified form of filter dome or cover, part broken away.

Figure 7 is an enlarged central vertical section taken on line 7—7 of Figure 6, and, Figure 8 is a central vertical section through a further modified form of filter dome or cover.

In drawings, where for the purpose of illustration, are shown preferred embodiments of the invention, attention is directed first to Figures 1 and 2 of the drawings, wherein the numeral 10 designates a large generally cylindrical funnel or shell for receiving the liquid to be filtered, such as milk. The funnel 10 is of relatively large diameter, and open at its top for receiving the milk from pails or the like. The top of the funnel 10 is flared outwardly to provide a rounded flange 11 which may be grasped for lifting the strainer or filter. The funnel 10 further comprises a generally horizontal bottom wall 12 which is preferably inclined downwardly somewhat, as shown, and the bottom wall 12 leads to and is integrally connected with a relatively shallow depending tubular extension or wall 13 of reduced diameter and arranged concentrically with the side wall of the funnel 10, and preferably curved as shown in Figure 2. The lower end of the reduced extension or wall 13 is inwardly directed for forming a relatively narrow annular horizontal ledge or shoulder 14, integral therewith, and in turn integrally secured at its inner margin to a further reduced depending cylindrical portion or sleeve 15 of a relatively short length as shown. The bottom of the reduced sleeve 15 is integrally joined with a downwardly conically tapering extension or discharge portion 16 having a flat bottom wall 17 provided with a discharge opening 18. The opening 18 and the bottom wall 17 are concentric with the portion 15 and the side wall of the funnel 10, as shown.

The parts thus far described constitute the unitary body portion of the strainer or filter, which is well adapted to be stamped or spun from sheet metal, such as stainless steel or the like.

A cover or dome 19 is provided, for arrangement inside of the cylindrical portion 15, and including a flat top wall 20 and a depending marginal skirt or wall 21, which is cylindrical and relatively short, as shown. The dome 19 has a slightly smaller diameter than the cylindrical portion 15, and is also somewhat shallower or shorter axially than the cylindrical portion 15. The top wall 20 of the dome 19 is provided with a plurality of equidistantly circumferentially spaced apertures 22, as shown, for the passage of milk, or the like, into the outlet extension 16. A suitable handle 23 for the dome 19 may be provided if desired, and rigidly secured by welding or the like to the top wall 20. The handle 23 may be omitted if desired, and if this is done, the dome 19 may be lifted or removed by utilizing the apertures 22 as finger grips.

The filter or strainer element proper is indicated at 24, and is preferably in the form of a circular section of cotton fabric, or the like having a larger diameter than the dome 19 and cylindrical portion 15 when flat. The strainer cloth 24 is adapted to have its marginal portion 25 clamped between the cylindrical wall or portion 15 and the cylindrical wall 21 of the dome 19 during use. This arrangement will hold the body portion of the strainer cloth 24 taut at the top of the conical discharge extension 16. The dome 19 will of course rest upon the strainer cloth 24 and upon the upper part of the conical extension or wall 16 in assembly, as shown in Figure 2. The marginal portion 25 of the strainer element and the cylindrical walls 15 and 21 are disposed in relatively tight clamping engagement in assembly, as previously suggested.

When assembling the parts of the strainer, the filtering element 24 in the generally flat condition may be applied through the top of the funnel 10 to rest upon the annular shoulder 14, as shown in broken lines in Figure 2. The subsequent introduction of the dome 19 downwardly into the cylindrical sleeve 15 will stretch the filtering element 24 into its position shown in full lines in Figure 2.

The funnel 10 is adapted to rest upon the upper end of the wide neck 26 of a conventional milk can 27, or the like, and the neck of the can 27 engages the generally horizontal wall 12 of the funnel outwardly of the depending extension 13, as shown. The cylindrical portion 15 and the conical discharge extension 16 project downwardly for some distance into the neck of the can 27, as shown, when the strainer is properly positioned upon the can 27 during use.

Milk or the like is poured into the funnel 10, which may hold several gallons of milk, and the milk will flow freely through the several openings 22 of the dome 19 and through the filtering element 24 and into the conically tapered discharge extension 16. From this extension, the filtered milk will flow with increased velocity through the outlet opening 18 and into the milk can 27.

The impurities or dirt in the milk will be strained out by the cloth or element 24, and deposited upon top of the same. It is a simple matter to inspect and replace the element 24 by merely removing the dome 19 and strainer element 24 and replacing the same as desired.

In Figures 6 and 7 I have shown a modified form of dome or cover 28 to be used instead of the dome 19 when preferred. The dome 28 has the same overall dimensions as the dome 19, and may occupy the same position inside of the cylindrical extension 15 as the dome 19. The dome 28 comprises a flat top wall 29 and a depending cylindrical marginal skirt 30 identical with the skirt 21. The top wall 29 may be provided with the identical openings 22 found in the top wall 20, and serving the identical purpose during the use of the strainer. The top wall 29 has an additional large central opening 31 formed therein, inwardly of the openings 22, and covered by a readily removable flat circular cover plate 32 of slightly larger diameter than the opening 31 and preferably having its marginal edge tangent to the inner sides of the openings 22, Figure 6. The cover or inspection plate 32 is held centered for covering the opening 31 by a plurality of depending marginal lugs 33 formed integral therewith, and adapted to engage through the adjacent openings 22 at the inner sides of the same.

In use, the dome 28 cooperates with the strainer cloth 24 in the identical manner stated in connection with the dome 19. However, the inspection plate 32 is readily removable from the dome 28 at any time so that the operator may view or inspect the condition of the strainer cloth 24 and then replace the plate 32. All other parts and their functions are the same as those shown and described in connection with Figures 1 and 2.

In Figure 8 there is shown a further modified form of dome 34 having the same overall proportions as the domes 19 and 28, and cooperating with the strainer cloth 24 in the identical manner. The dome 34 has a flat top wall 35 and a depending cylindrical marginal skirt 36, integral therewith. The top wall 35 of the dome 34 has a single large central opening 37 formed therein for the reception of a flat circular plate 38 which may be removable. The plate 38 is supported within the dome 34 and spaced below its top wall 35 by a pair of crossed diametrically extending wires 39, having upwardly directed ends 40, rigidly secured in any suitable manner to the top wall 35 just outside of the opening 37. This arrangement allows the milk or other liquid being filtered to pass over the removable plate 38 and through the space at the margin of the plate 38 between it and the top wall 35. The entire dome 34 functions in the same manner as the domes 19 and 28 with respect to the filtering cloth 24, and the plate 38 may be removed to inspect the filtering cloth, if desired. All other parts are identical with those shown and described in connection with Figures 1 and 2, and the overall operation of the assembled strainer is the same, regardless of which of the domes 19, 28 or 34 is employed.

In Figures 3 to 5 inclusive there is shown a modified form of strainer well adapted for straining cooking fats or like liquids having relatively large amounts of solid matter disbursed therethrough. This strainer embodies a funnel or shell 41 including an upper portion or side wall 42 which is substantially cylindrical and a downwardly conically tapered lower portion or wall 43 adapted to rest upon the neck or top of a receptacle such as a bowl or saucepan. The funnel 41 is provided at its open top end with an outwardly rolled gripping flange 44 which may be identical with the flange 11. The lower end of the conically tapered funnel portion 43 is inwardly directed to form a horizontal annular ledge 45, integral therewith, and provided at its inner margin with a depending short cylindrical wall or sleeve 46, integral therewith. The sleeve 46 at its lower end carries a depending downwardly conically tapering discharge extension 47, integral therewith, and this discharge extension 47 may be identical with the extension 16. The discharge extension 47 has a flat bottom wall 48, provided with a central discharge opening 49, as shown.

The same cloth strainer element 24 of the prior form of the invention may be employed inside of the cylindrical sleeve 46, with its marginal portion 25 securely clamped between the sleeve 46 and the cylindrical side wall 50 of a clamping dome or cover 51. The filtering cloth 24 is maintained taut at the top of the discharge extension 47 in the identical manner shown and described in connection with the first form of the invention.

The dome 51 includes a flat top wall 52, integrally joined with the side wall 50 and provided with a small central vent opening 53 for the escape of air from within the dome 51. The dome 51 is further provided in its side wall 50 at substantially the elevation of the ledge 45 with one or more openings 54, to permit the passage of the liquid onto the filtering cloth 24 from the funnel. The dome 51 is substantially deeper than the domes 19, 28 and 34, and the top wall 52 projects a substantial distance above the ledge 45, as does the side wall 50 for forming a surrounding annular well or sediment chamber 55 between the side wall 43 and the dome 51.

In use, the liquid to be filtered is introduced into the top of the funnel 41, and passes through the opening or openings 54 to the interior of the dome 51 and upon the filter cloth 24, which strains the liquid and allows it to pass into the discharge extension 47, and thence through the outlet opening 49, to the bowl, saucepan or other cooking utensil.

The air escaping upwardly through the vent hole 53 will cause concentric eddy waves to pass outwardly through the liquid in the funnel and drive the larger sediment particles into the annular sediment trap 55, where they settle. Some sediment will collect or settle on the top wall 52 of the dome 51, but most of the sediment will collect in the trap 55. The filter element 24 will filter or strain out the fine particles or impurities, and the filtering element will remain clean much longer due to the action of the trap 55, thereby increasing its capacity for straining considerably. As in the first form of the invention, the dome 51 and filter element 24 are readily removable.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. A strainer comprising a funnel-like body portion having a reduced discharge extension at its lower end, a foraminous strainer element disposed within said discharge extension, a dome disposed within the discharge extension and serving to clamp the marginal portion of the strainer element between it and the side wall of the discharge extension, the bottom of the dome being open, the dome including a flat horizontal top wall having openings for the passage of liquid therethrough and an inspection opening, and a plate removably mounted upon the top wall of the dome and covering said inspection opening and having parts slidingly engaging the first named openings in the top wall of the dome for centering the plate.

2. A strainer comprising a funnel like body, a cylindrical wall portion disposed axially of said body, a bottom wall portion extending conically inward of the bottom end of said cylindrical wall, said bottom wall having a discharge opening, a strainer element, a strainer holder having a cylindrical side wall clamping the margin of the strainer against said cylindrical body wall and the conical bottom wall, a top wall connected to the top end of said cylindrical holder wall and provided with a central inspection opening and a plurality of side openings, and a cover detachably engageable with said holder top wall to removably close the central inspection opening in the holder, said cover being formed so as to close the central opening only and provided with lugs for slidable engagement with the side openings.

References Cited in the file of this patent

UNITED STATES PATENTS

| 1,794,596 | Dowling | Mar. 3, 1931 |
| 2,410,010 | Brant | Oct. 29, 1946 |
| 2,613,454 | White | Oct. 14, 1952 |
| 2,701,644 | Griffiths | Feb. 8, 1955 |